United States Patent
Watanabe

(10) Patent No.: US 7,920,953 B2
(45) Date of Patent: Apr. 5, 2011

(54) FOUR-WHEEL DRIVE VEHICLE RUNNING CONTROL DEVICE

(75) Inventor: Satoki Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 984 days.

(21) Appl. No.: 11/797,541

(22) Filed: May 4, 2007

(65) Prior Publication Data

US 2007/0260388 A1 Nov. 8, 2007

(30) Foreign Application Priority Data

May 8, 2006 (JP) .................................. 2006-129612

(51) Int. Cl.
*G06F 19/00* (2006.01)
(52) U.S. Cl. ........................................................ 701/70
(58) Field of Classification Search .............. 701/69–70, 701/81, 89; 180/197; 477/34, 107–108, 477/110, 115
See application file for complete search history.

(56) References Cited

U.S. PATENT DOCUMENTS

| 4,866,618 | A | * | 9/1989 | Tamura et al. | ................ | 701/101 |
| 5,041,978 | A | * | 8/1991 | Nakayama et al. | ............ | 701/84 |
| 5,096,015 | A | * | 3/1992 | Akishino et al. | ............. | 180/179 |
| 5,197,008 | A | * | 3/1993 | Itoh et al. | ........................ | 701/70 |

FOREIGN PATENT DOCUMENTS

JP 07-040040 B2 5/1995

* cited by examiner

*Primary Examiner* — Yonel Beaulieu
(74) *Attorney, Agent, or Firm* — Westerman, Hattori, Daniels & Adrian, LLP

(57) ABSTRACT

The running control device according to the present invention has an operation stability control unit which calculates a control lateral acceleration from the actual lateral acceleration measured by the lateral acceleration sensor and the estimated lateral acceleration calculated by the estimated lateral acceleration calculation unit and which carries out a control of drive power distribution transmitted from the engine to the front wheels and the rear wheels based on the calculated control lateral acceleration. If either the estimated lateral acceleration or the control lateral acceleration differs from the actual lateral acceleration by not less than a predetermined value, the operation stability control unit carries out a control to reduce the drive power distributed to the front wheels or the rear wheels.

10 Claims, 8 Drawing Sheets

FOUR-WHEEL DRIVE VEHICLE RUNNING CONTROL DEVICE

FIELD OF THE INVENTION

The present invention relates to a running control device for a four-wheel drive vehicle, and more particularly to the control of the distribution of drive power that is transmitted from the engine to the front wheels and rear wheels.

BACKGROUND OF THE INVENTION

Some four-wheel drive vehicles have a lateral acceleration sensor that measures the lateral acceleration acting on the four-wheel drive vehicle, and a drive power distribution control device that controls the distribution of drive power transmitted to the front wheels and rear wheels based on the measured lateral acceleration. This type of four-wheel drive vehicle includes sensor fault detection means for detecting faults in the lateral acceleration sensor due to a breakdown, or similar. When the sensor fault detection means detects a breakdown (fault), a predetermined fail safe operation is carried out (see for example, Japanese Patent Publication No. H7-40040).

However, conventionally, in the time from occurrence of an actual sensor breakdown until the sensor breakdown is detected (usually about 10 seconds), the drive power distribution ratio and so on are calculated based on faulty measurement values. Therefore, there was a danger of altered behavior of the vehicle due to inappropriate drive power distribution, and reduced running stability. Also, after a sensor breakdown is detected a fail safe operation is started. Therefore, if for example during the fail safe operation drive power distribution to the rear wheels is stopped, distribution of drive power to the rear wheels is suddenly stopped from an inappropriate state, so there was the danger that the vehicle behavior immediately after starting the fail safe operation would be unstable.

SUMMARY OF THE INVENTION

It is an object of the present invention to provide a running control device for a four-wheel drive vehicle that improves the running safety of the vehicle.

To achieve this object, the running control device (for example, the 4WD-ECU 100 in the embodiments) for a four-wheel drive vehicle according to the present invention is a running control device for a four-wheel drive vehicle that runs by transmitting rotational output from an engine to front wheels and rear wheels; comprising: lateral acceleration measurement means (for example the lateral acceleration sensor 16 in the embodiments) for measuring an actual lateral acceleration acting on the four-wheel drive vehicle; lateral acceleration calculation means (for example, the estimated lateral acceleration calculation unit 131 in the embodiments) for calculating an estimated lateral acceleration of the four-wheel drive vehicle based on the speed of the four-wheel drive vehicle and the steering angle of the front wheels, which are steering wheels; and a drive power distribution control unit (for example, the operation stability control unit 130 in the embodiments) that calculates a control lateral acceleration from the actual lateral acceleration measured by the lateral acceleration measurement means and the estimated lateral acceleration calculated by the lateral acceleration calculation means, and carries out control of distribution of drive power transmitted to the front wheels and rear wheels from the engine based on the calculated control lateral acceleration, wherein if the difference between the estimated lateral acceleration and the actual lateral acceleration, or the difference between the control lateral acceleration and the actual lateral acceleration is equal to or greater than a predetermined value, the drive power distribution control unit carries out a control to reduce the drive power distributed to the front wheels or the rear wheels.

Also, in the above invention, it is preferable if the control lateral acceleration is calculated by combining the actual lateral acceleration measured by the lateral acceleration measurement means and the estimated lateral acceleration calculated by the lateral acceleration calculation means in specific proportions, and the specific proportions are calculated in accordance with the speed of the four-wheel drive vehicle.

According to the four-wheel drive vehicle running control device of the present invention, when the difference between the estimated lateral acceleration and the actual lateral acceleration, or the difference between the control lateral acceleration and the actual lateral acceleration is equal to or greater than a predetermined value, a control to reduce the drive power distributed to the front wheels or the rear wheels is carried out by the drive power distribution control unit. Therefore, it is possible to reduce the control output based on faulty measurement values from before the detection of a breakdown of the lateral acceleration measurement means or the like, and stabilize the vehicle behavior. Therefore it is possible to improve the vehicle running stability. Also, by reducing the drive power distributed to the front wheels or the rear wheels in accordance with the difference between the estimated lateral acceleration (or control lateral acceleration) and the actual lateral acceleration, if during a fail safe operation the distribution of power to the front wheels or the rear wheels is stopped, the result is that the distribution of drive power to the front wheels or rear wheels is gradually stopped. Therefore it is possible to stabilize the behavior of the vehicle immediately after start of the fail safe operation.

Also, preferably the control lateral acceleration is calculated by combining the actual lateral acceleration measured by the lateral acceleration measurement means and the estimated lateral acceleration calculated by the lateral acceleration calculation means in specific proportions that are calculated in accordance with the vehicle speed of the four-wheel drive vehicle. In this way, the control lateral acceleration can be easily calculated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 2:
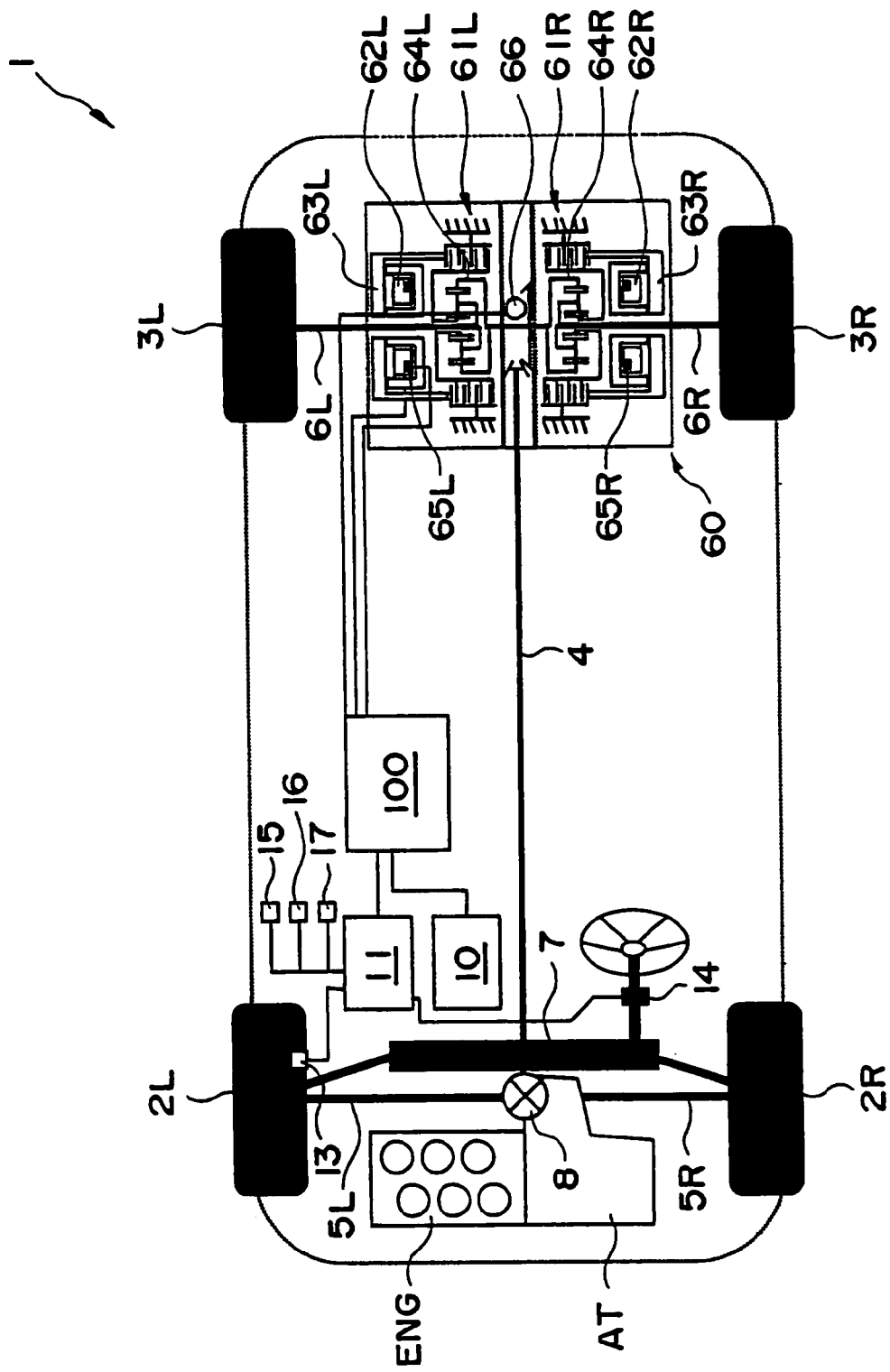
FIG. 2 is a schematic diagram of a four-wheel drive vehicle.

The following is an explanation of the preferred embodiments of the present invention with reference to the drawings. FIG. 2 schematically shows a four-wheel drive vehicle 1 having a running control device according to the present invention. The four-wheel drive vehicle 1 includes left and right front wheels 2L, 2R, and left and right rear wheels 3L, 3R, which are the drive wheels; an engine ENG that drives the rotation of the front wheels 2L, 2R and the rear wheels 3L, 3R; an automatic transmission AT that transmits the rotational drive torque (rotational drive power) output from the engine ENG; a propeller shaft 4 that transmits the rotational drive torque (rotational drive power) output from the automatic transmission AT to the front wheels 2L, 2R and the rear wheels 3L, 3R; left and right front drive shafts 5L, 5R; and left and right rear drive shafts 6L, 6R.

Also, the four-wheel drive vehicle 1 includes a steering device 7, that changes the direction of the front wheels 2L, 2R, which are the steering wheels, a differential mechanism 8, a drive power control device 60, several electronic control units (ECU) 10, 11, 100, and so on. The ECUs include an FI/AT-ECU 10, which controls the operation of the engine ENG and automatic transmission AT; an ESC-ECU 11, which is the vehicle behavior stabilization control system electronic control unit; and an 4WD-ECU 100, which distributes drive power to the front wheels 2L, 2R and the rear wheels 3L, 3R, and so on. The FI/AT-ECU 10, ESC-ECU 11, and 4WD-ECU 100 are electrically connected.

Also, wheel speed sensors 13 are provided on the front wheels 2L, 2R and the rear wheels 3L, 3R to measure the wheel speed (rotation speed) of each wheel. The wheel speed sensors 13 are electrically connected to the ESC-ECU 11. A steering angle sensor 14 is provided on the steering device 7 to measure the steering angle of the front wheels 2L, 2R. The steering angle sensor 14 is electrically connected to the ESC-ECU 11. Furthermore, the four-wheel drive vehicle 1 includes a yaw rate sensor 15 that measures the yaw rate, a lateral acceleration sensor 16 that measures the lateral acceleration (actual lateral acceleration) acting on the four-wheel drive vehicle, and a longitudinal acceleration sensor 17 that measures the longitudinal acceleration, each electrically connected to the ESC-ECU 11.

Figure 3:
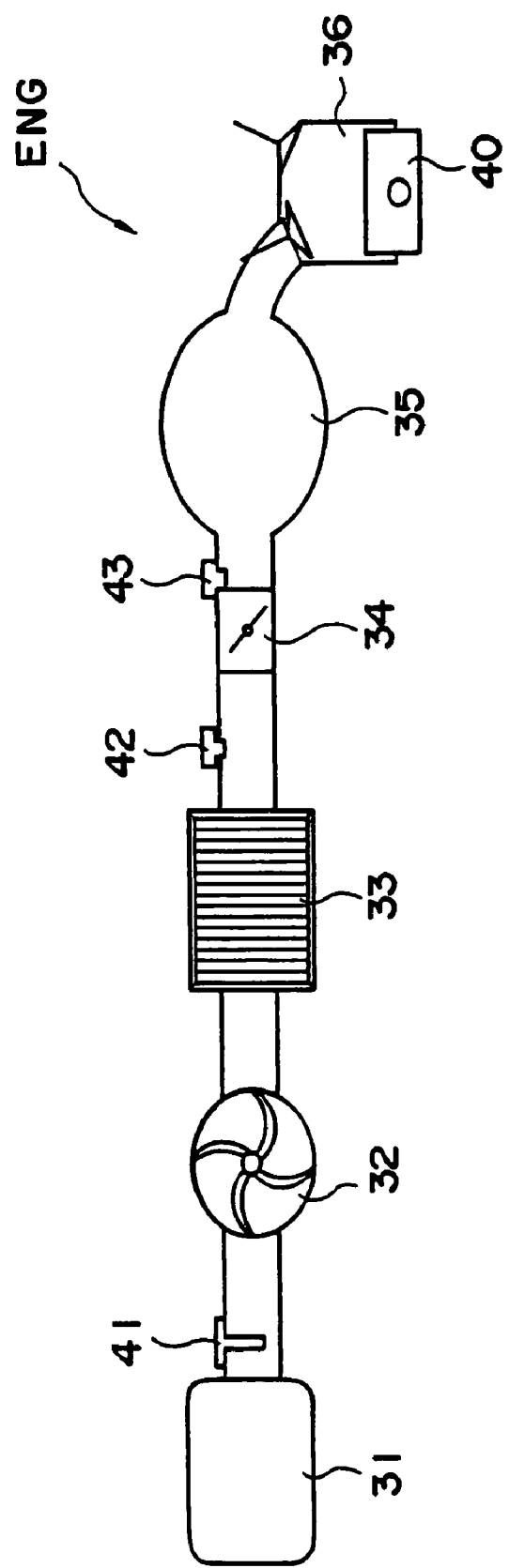
FIG. 3 is a schematic diagram showing the air intake system of the engine.

As shown in FIG. 3, the engine ENG includes an air cleaner 31 into which external air is drawn; a compressor 32 as a supercharger that compresses the air drawn into the air cleaner 31 and transmits the air to the engine ENG; an intercooler 33 that cools the air transmitted from the compressor 32; a throttle 34 that adjusts the flow rate of air drawn into the engine ENG; and an intake manifold 35 that transmits air from the throttle 34 to cylinders 36 of the engine ENG. As can be understood from this, the engine is a supercharged engine ENG.

An air flow meter 41 is installed in the channel between the air cleaner 31 and the compressor 32, to measure the flow rate of the air drawn into the air cleaner 31, in other words the flow rate of the air drawn into the engine ENG. Also, a first pressure sensor 42 is installed in the channel between the intercooler 33 and the throttle 34, to measure the pressure of the air flowing between the intercooler 33 and the throttle 34. Also, a second pressure sensor 43 is installed in the intake manifold 35 to measure the pressure of the air flowing in the intake manifold 35.

Figure 4:
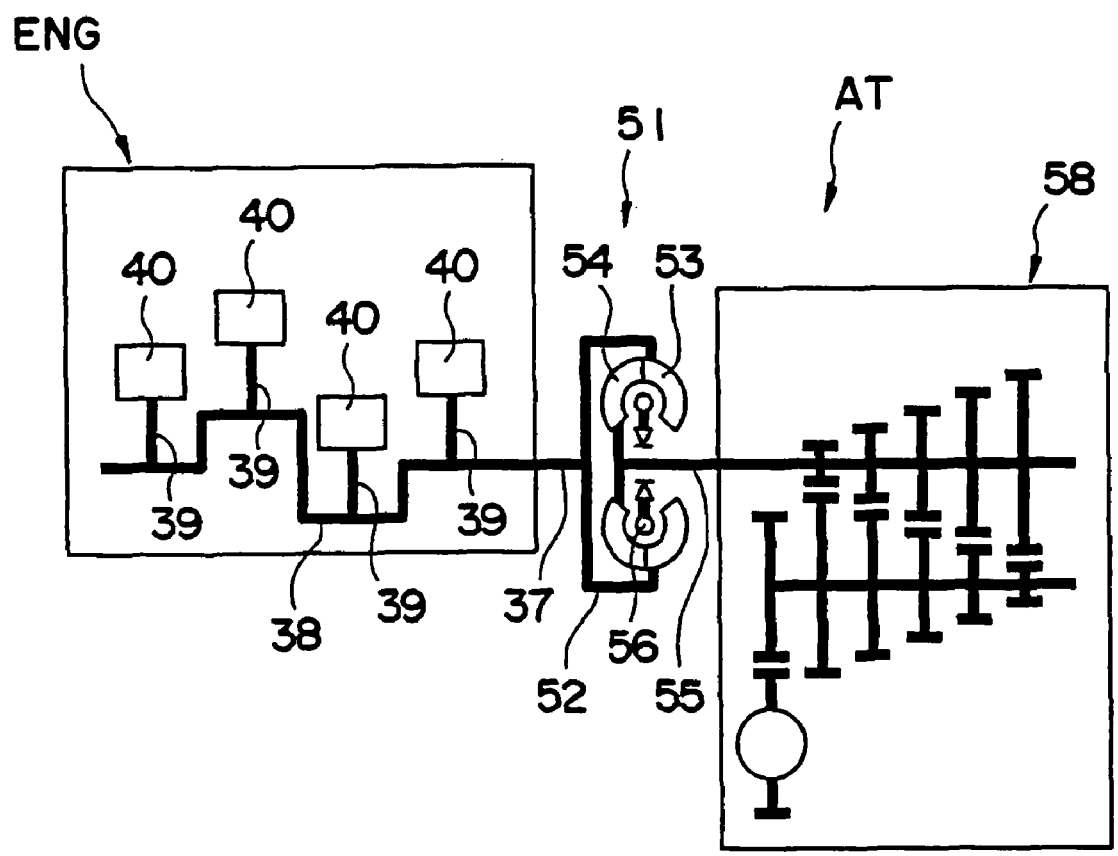
FIG. 4 is a schematic diagram of the engine and automatic transmission.

As shown in FIG. 4, The automatic transmission AT is connected to an output shaft 37 of the engine ENG. The output shaft 37 of the engine ENG is connected to a crankshaft 38 within the engine ENG. The crankshaft 38 is connected to pistons 40 within the cylinders 36 (see FIG. 3) via connecting rods 39.

As shown in FIG. 4, the automatic transmission AT includes mainly a torque converter 51 and a gear train 58. The gear train 58 changes the speed of rotation of the output rotation from the engine ENG transmitted by the torque converter 51 and transmits the rotation to each wheel. The torque converter 51 includes a case 52 connected to the output shaft 37 of the engine ENG; an impeller 53 disposed within and connected to the case 52; a turbine 54 connected to a main shaft 55 that is the output shaft of the torque converter 51, disposed within the case 52; and a stator 56 disposed between the impeller 53 and the turbine 54 within the case 52. When the output shaft 37 of the engine ENG rotates, the case 52 connected to the output shaft 37 of the engine ENG and the impeller 53 also rotate. In addition the turbine 54 and the main shaft 55 also rotate via oil that fills the case 52. Therefore, the rotational drive torque output from the engine ENG is transmitted to the gear train 58 via the torque converter 51.

The main shaft 55 is the input shaft of the gear train 58. When the main shaft 55 rotates, the rate of rotation is converted by a predetermined gear change ratio by the gear train 58, and transmitted to the front wheels 2L, 2R and the rear wheels 3L, 3R.

Also, as shown in FIG. 2, the drive power control device 60 includes left and right multiple disk type brake clutches 61L, 61R connected to the propeller shaft 4 and the left and right drive shafts 6L, 6R; left and right electromagnetic coils 62L, 62R; left and right armatures 63L, 63R that activate the brake of the left and right brake clutches 61L, 61R; and left and right planetary gears 64L, 64R, connected to the left and right rear drive shafts 6L, 6R respectively.

The left and right electromagnetic coils 62L, 62R are electrically connected to the 4WD-ECU 100. When drive current flows from the 4WD-ECU 100 to the left electromagnetic coil 62L, the left armature 63L is pressed against and engages with the left brake clutch 61L by the electromagnetic force generated by the left electromagnetic coil 62L. Therefore the rotational drive torque of the propeller shaft 4 is transmitted to the left planetary gear 64L side, and clutch torque is generated in accordance with the engagement force. Then the clutch torque generated in the left brake clutch 61L is magnified by the left planetary gear train 64L and output to the left rear drive shaft 6L. As a result of the clutch torque the left rear drive shaft 6L and the left rear wheel 3L are driven to rotate. If drive current does not flow in the left electromagnetic coil 62L, the electromagnetic force is not generated, so the left brake clutch 61L is not engaged, and the clutch torque is not generated.

On the other hand, when drive current flows from the 4WD-ECU 100 to the right electromagnetic coil 62R, the right armature 63R is pressed against and engages with the right brake clutch 61R by the electromagnetic force generated by the right electromagnetic coil 62R. Therefore the rotational drive torque of the propeller shaft 4 is transmitted to the right planetary gear 64R side, and clutch torque is generated in accordance with the engagement force. Then the clutch torque generated in the right brake clutch 61R is magnified by the right planetary gear train 64R and output to the right rear drive shaft 6R. As a result of the clutch torque the right rear drive shaft 6R and the right rear wheel 3R are driven to rotate. If drive current does not flow in the right electromagnetic coil 62R, the electromagnetic force is not generated, so the right brake clutch 61R is not engaged, and the clutch torque is not generated.

Also, the drive power control device 60 includes left and right search coils 65L, 65R that measure the air gaps between the left or right electromagnetic coils 62L, 62R and the left or right armatures 63L, 63R respectively. The drive power control device 60 also includes an oil temperature sensor 66 that measures the temperature of oil within the drive power control device 60, installed in a predetermined location.

Also, drive torque output from the engine ENG is transmitted to the left and right front wheels 2L, 2R via the automatic transmission AT, the differential mechanism 8, and the left and right front drive shafts 5L, 5R. In addition, drive torque output from the engine ENG is transmitted to the left and right rear wheels 3L, 3R via the automatic transmission AT, the differential mechanism 8, the propeller shaft 4, the drive power control device 60, and the left and right rear drive shafts 6L, 6R. At this time, the distribution of drive power to the front wheels 2L, 2R and the rear wheels 3L, 3R is controlled by the 4WD-ECU 100 and the drive power control device 60.

Figure 5:
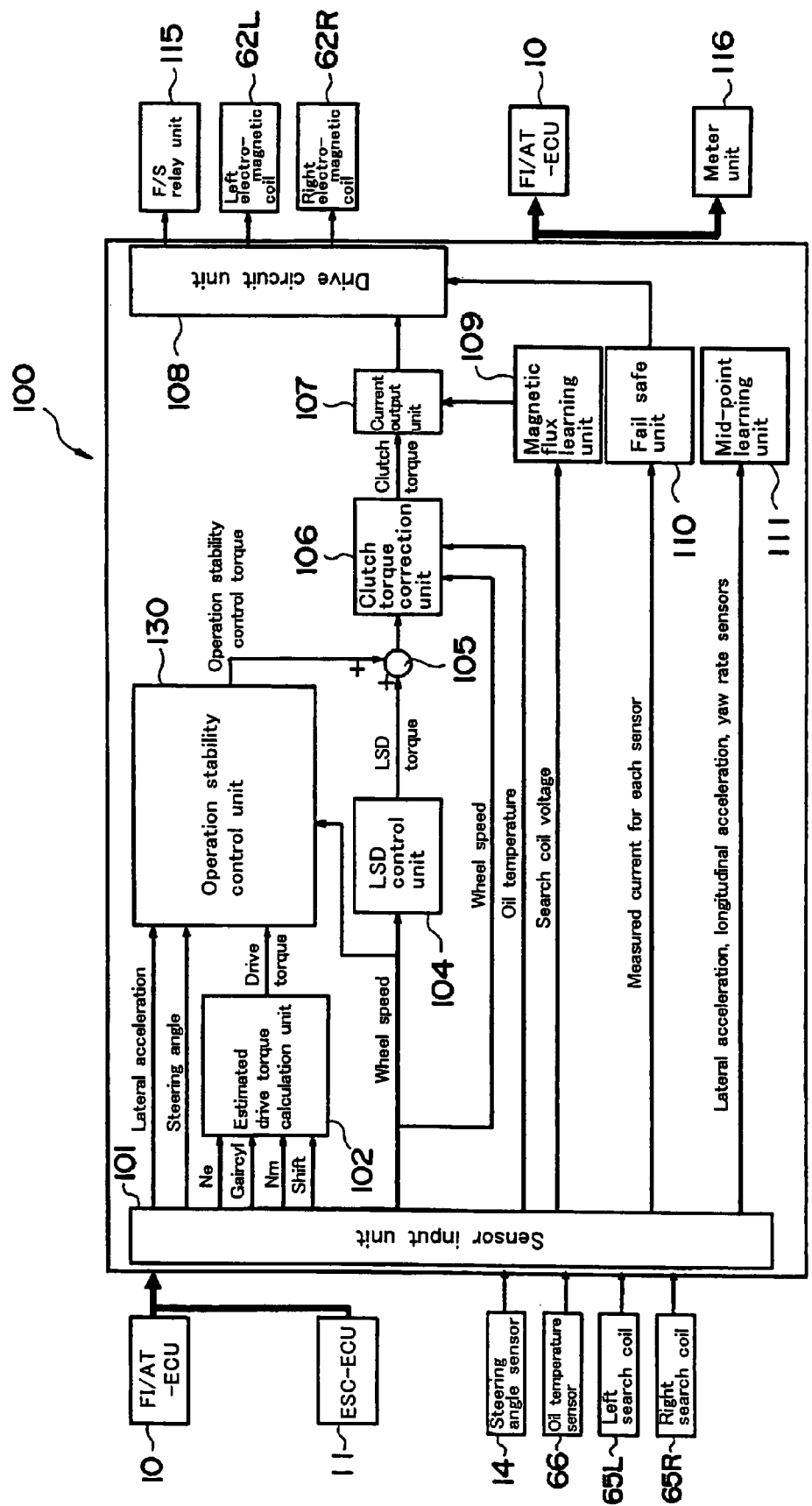
FIG. 5 is a control block diagram of the 4WD-ECU.

The following is an explanation of the 4WD-ECU 100, which is the running control device according to the present invention, with reference to FIG. 5. As shown in FIG. 5, information can be input from the FI/AT-ECU 10 and the ESC-ECU 11 to a sensor input unit 101 of the 4WD-ECU 100 using what is called a controller area network (CAN). The information input by the FI/AT-ECU 10 includes the engine rotation speed Ne (rotation speed of the engine ENG output shaft 37), the cylinder intake air flow rate Gaircyl, the main shaft 55 rate of rotation Nm of the torque converter 51, the shift position, and so on. Also, the information input from the ESC-ECU 11 includes wheel speeds measured by the wheel speed sensors 13, the yaw rate measured by the yaw rate sensor 15, the lateral acceleration measured by the lateral acceleration sensor 16, the longitudinal acceleration measured by the longitudinal acceleration sensor 17, and so on.

The cylinder intake air flow rate Gaircyl, which is the flow rate of air into the engine ENG, is calculated by the FI/AT-ECU 10 based on the air flow rate measured by the air flow meter 41, the pressure variation per unit time measured by the first pressure sensor 42, the pressure variation per unit time measured by the second pressure sensor 43, and so on.

Also, the steering angle measured by the steering angle sensor 14, the oil temperature within the drive power control device 60 measured by the oil temperature sensor 66, the voltage value measured by the left search coil 65L, the voltage value measured by the right search coil 65R, and so on, are input to the sensor input unit 101.

The engine rotation speed Ne, the cylinder intake air flow rate Gaircyl, main shaft 55 rate of rotation Nm, the shift position, and the wheel speeds (rate of rotation of each wheel) are input to an estimated drive torque calculation unit 102 from the sensor input unit 101. The estimated drive torque calculation unit 102 calculates the estimated drive torque by the engine ENG, based on the input data, and outputs the calculated estimated drive torque to an operation stability control unit 130.

The engine ENG estimated drive torque output from the estimated drive torque calculation unit 102, and the lateral acceleration, the steering angle, wheel speed output from the sensor input unit 101 are input to the operation stability control unit 130. The operation stability control unit 130 calculates the operation stability control torque based on the input data, and outputs the operation stability control torque to a torque addition unit 105. Also, the wheel speed is input from the sensor input unit 101 to an LSD control unit 104. The LSD control unit 104 calculates the LSD torque based on the wheel speeds, and outputs the calculated LSD torque to the torque addition unit 105.

The operation stability control torque and the LSD torque are added in the torque addition unit 105, and the added torque (in other words, the drive torque distributed to the left and right rear wheels 3L, 3R) is input to the clutch torque correction unit 106. Based on the torque value input from the torque addition unit 105, the wheel speeds input from the sensor input unit 101, and the oil temperature within the drive power control device 60, the clutch torque correction unit 106 calculates the clutch torque to be generated by the drive power control device 60, and outputs the calculated clutch torque to a current output unit 107.

To obtain the clutch torque calculated by the clutch torque correction unit 106, the current output unit 107 calculates the drive current value of the left electromagnetic coil 62L and the right electromagnetic coil 62R, and outputs the calculated current values to the drive circuit unit 108. Then the drive circuit unit 108 outputs drive current to the left electromagnetic coil 62L and the right electromagnetic coil 62R so that the current values calculated by the current output unit 107 is obtained. In this way, the drive current is output to each electromagnetic coil 62L, 62R of the drive power control device 60 from the 4WD-ECU 100, and power is distributed to the front wheels 2L, 2R and the rear wheels 3L, 3R.

A magnetic flux learning unit 109 calculates current correction values to correct the left electromagnetic coil 62L and the right electromagnetic coil 62R drive current values, based on the search coil voltage input from the sensor input unit 101. The calculated current correction values are output to the current output unit 107. Then the drive current values are corrected in the current output unit 107 in order to obtain the required electromagnetic force in the left and right electromagnetic coils 62L, 62R.

Also, the values of the measured current or the like from each sensor are input from the sensor input unit 101 to a fail safe unit 110. In the event of a breakdown or other predetermined conditions, the fail safe unit 110 outputs a fail safe signal to the drive circuit unit 108. When a fail safe signal is input to the drive circuit unit 108, a relay drive current is output from the drive circuit unit 108 to an F/S relay unit 115. The F/S relay unit 115 operates so that drive current does not flow to the left and right electromagnetic coils 62L, 62R. Furthermore, the 4WD-ECU 100 outputs a torque down request signal to the FI/AT-ECU 10, and an alarm light display signal is output to a meter unit 116.

Also, the yaw rate, lateral acceleration, and longitudinal acceleration are input to a midpoint learning unit 111. The midpoint learning unit 111 learns the midpoints of the yaw rate, lateral acceleration, and longitudinal acceleration.

Figure 1:
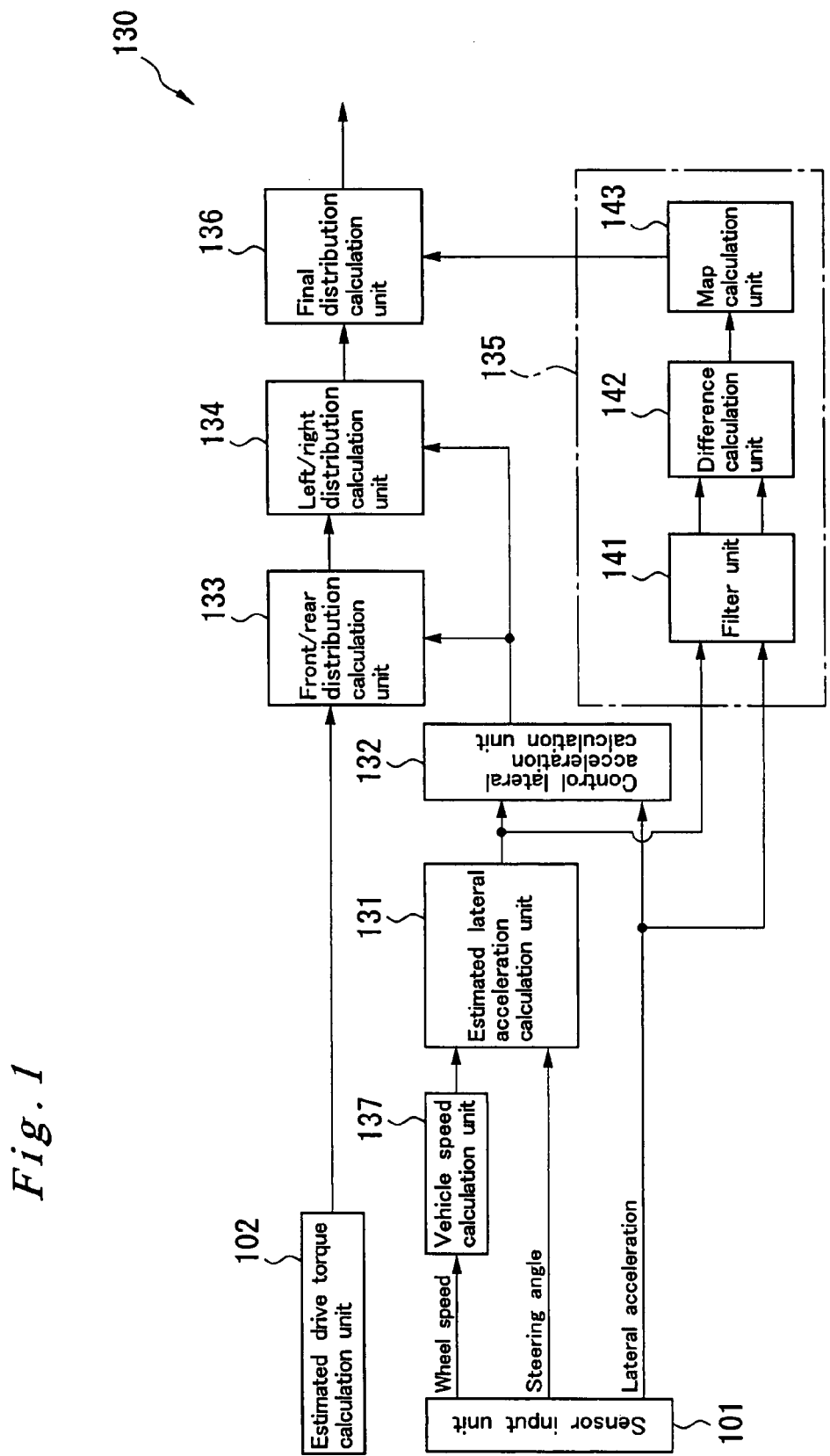
FIG. 1 is a control block diagram of the operation stability control unit that forms part of the 4WD-ECU.

Next, the operation stability control unit 130 is explained in detail with reference to FIG. 1. As shown in FIG. 1, the operation stability control unit 130 includes an estimated lateral acceleration calculation unit 131, a control lateral acceleration calculation unit 132, a front/rear distribution calculation unit 133, a left/right distribution calculation unit 134, a reduction coefficient calculation unit 135, and a final distribution calculation unit 136.

The four-wheel drive vehicle 1 vehicle speed output from a vehicle speed calculation unit 137 and the steering angle of the front wheels 2L, 2R output from the sensor input unit 101 are input to the estimated lateral acceleration calculation unit 131. The vehicle speed calculation unit 137 calculates the (estimated) vehicle speed of the four-wheel drive vehicle 1 based on the rotation speed (wheel speed) of each wheel input from the sensor input unit 101. The vehicle speed calculation unit 137 outputs the calculated vehicle speed to the estimated lateral acceleration calculation unit 131. Then the estimated lateral acceleration calculation unit 131 calculates the estimated lateral acceleration of the four-wheel drive vehicle 1 based on the input vehicle speed and steering angle. Then the estimated lateral acceleration calculation unit 131 outputs the calculated estimated lateral acceleration to the control lateral acceleration calculation unit 132.

The estimated lateral acceleration output from the estimated lateral acceleration calculation unit 131, and the actual lateral acceleration output from the sensor input unit 101 are input to the control lateral acceleration calculation unit 132. The control lateral acceleration calculation unit 132 calculates the control lateral acceleration by combining the actual lateral acceleration and the estimated lateral acceleration in predetermined proportions, using the following Equation (1). The calculated control lateral acceleration is output to the front/rear distribution calculation unit 133 and the left/right distribution calculation unit 134.

$$\text{Control lateral acceleration} = (\text{estimated lateral acceleration} \times K) + (\text{actual lateral acceleration} \times (1-K)) \quad (1)$$

Here, K is a coefficient ($0 \leq K \leq 1$) that decreases as the vehicle speed increases. In other words, the proportions for combining the actual lateral acceleration and the estimated lateral acceleration are calculated in accordance with the vehicle speed.

The engine ENG estimated drive torque output from the estimated drive torque calculation unit 102, and the control lateral acceleration output from the control lateral acceleration calculation unit 132 are input to the front/rear distribution calculation unit 133. The front/rear distribution calculation unit 133 sets the front/rear distribution ratio based on the input control lateral acceleration, multiplies the set (rear wheel) front/rear distribution ratio by the estimated drive torque to calculate the drive torque transmitted to the rear wheels. The calculated drive torque (to be transmitted to the rear wheels) is output to the left/right distribution calculation unit 134. The front/rear distribution ratio (for the rear wheels) basically increases as the control lateral acceleration increases, and is calculated from a predetermined map in accordance with the control lateral acceleration, and so on. For example, the front/rear distribution ratio is set within the range 70:30 to 30:70 for front wheels: rear wheels.

The drive torque (to be transmitted to the rear wheels) output from the front/rear distribution calculation unit 133 and the control lateral acceleration output from the control lateral acceleration calculation unit 132 are input to the left/right distribution calculation unit 134. The left/right distribution calculation unit 134 sets the left/right distribution ratio based on the input control lateral acceleration, and multiplies the set left/right distribution ratio by the input drive torque, to calculate the drive torque to be transmitted to the left and right rear wheels 3L, 3R. The calculated drive torques (to be transmitted to the left and right rear wheels 3L, 3R) are output to the final distribution calculation unit 136. The left/right distribution ratio is basically set so that as the control lateral acceleration increases, the rate of rotation of the outer wheel increases. The left/right distribution ratio is calculated from a predetermined map in accordance with the control lateral acceleration, and so on. For example, the left/right distribution ratio is set in the range from 100:0 to 0:100 for left wheel: right wheel.

The reduction coefficient calculation unit 135 includes a filter unit 141, a difference calculation unit 142, and a map calculation unit 143. The estimated lateral acceleration output from the estimated lateral acceleration calculation unit 131, and the actual lateral acceleration output from the sensor input unit 101 are input to the filter unit 141. The filter unit 141 is what is known as a lowpass filter. The filter unit 141 attenuates predetermined frequency components of the input estimated lateral acceleration and the actual lateral acceleration, and outputs the result to the difference calculation unit 142. The difference calculation unit 142 calculates the difference (absolute value) of the estimated lateral acceleration and the actual lateral acceleration (in which predetermined frequency components have been attenuated) input from the filter unit 141, and outputs the difference to the map calculation unit 143.

If the difference (absolute value) of the estimated lateral acceleration and the actual lateral acceleration input from the difference calculation unit 142 is equal to or greater than a predetermined value, the map calculation unit 143 calculates a reduction coefficient in accordance with the difference between the estimated lateral acceleration and the actual lateral acceleration, and outputs the calculated reduction coefficient to the final distribution calculation unit 136. The reduction coefficient is calculated from a predetermined map in accordance with the difference between the estimated lateral acceleration and the actual lateral acceleration. When the difference (absolute value) in the estimated lateral acceleration and the actual lateral acceleration is equal to or greater than the predetermined value, the larger the difference between the estimated lateral acceleration and the actual lateral acceleration the smaller the value of the reduction coefficient. If the difference (absolute value) in the estimated lateral acceleration and the actual lateral acceleration is less than the predetermined value, the map calculation unit 143 sets the reduction coefficient to 1, and outputs this value to the final distribution calculation unit 136.

The drive torques (to be transmitted to the left and right rear wheels 3L, 3R) output from the left/right distribution calculation unit 134, and the reduction coefficient output from the map calculation unit 143 of the reduction coefficient calculation unit 135 are input to the final distribution calculation unit 136. Then, the final distribution calculation unit 136 multiplies the input drive torques (to be transmitted to the left and right rear wheels 3L, 3R) by the reduction coefficient, and outputs the drive torques (to be transmitted to the left and right rear wheels 3L, 3R) that have been multiplied by the reduction coefficient to the torque addition unit 105 as the operation stability torques.

In this way, in the operation stability control unit 130, the front/rear distribution calculation unit 133 calculates the drive torque to be transmitted to the rear wheels, based on the control lateral acceleration calculated by the control lateral acceleration calculation unit 132. Also, the left/right distribution calculation unit 134 calculates the drive torques to be transmitted to the left and right rear wheels 3L, 3R, based on the control lateral acceleration. Then the operation stability control unit 130 controls the drive power distribution to be transmitted to the front wheels 2L, 2R and the rear wheels 3L, 3R. The control lateral acceleration is calculated by the control lateral acceleration calculation unit 132 by combining the estimated lateral acceleration calculated by the estimated lateral acceleration calculation unit 131 and the actual lateral acceleration measured by the lateral acceleration sensor 16 in specific proportions set in accordance with the vehicle speed.

At this time, if the difference (absolute value) in the estimated lateral acceleration calculated by the reduction coefficient calculation unit 135 (difference calculation unit 142) is less than a predetermined value, the reduction coefficient input from the reduction coefficient calculation unit 135 (map calculation unit 143) to the final distribution calculation unit 136 is 1. In this case, the final distribution calculation unit 136 multiplies the drive torques (to be transmitted to the left and right rear wheels 3L, 3R) input from the left/right distribution calculation unit 134 by 1. In other words, the drive torques to be transmitted to the left and right rear wheels 3L, 3R calculated by the left/right distribution calculation unit 134 are output unchanged to the torque addition unit 105 as the operation stability control torques.

On the other hand, if the difference (absolute value) in the estimated lateral acceleration calculated by the reduction coefficient calculation unit 135 (difference calculation unit 142) is greater than the predetermined value, the reduction coefficient input from the reduction coefficient calculation unit 135 (map calculation unit 143) to the final distribution calculation unit 136 is set so that the larger the difference between the estimated lateral acceleration and the actual lateral acceleration the smaller the value of the reduction coefficient. In this case, the final distribution calculation unit 136 multiplies the drive torques (to be transmitted to the left and right rear wheels 3L, 3R) input from the left/right distribution calculation unit 134 by a reduction coefficient that is smaller than 1. The drive torques to be transmitted to the left and right rear wheels 3L, 3R that have been multiplied by the reduction coefficient are output to the torque addition unit 105 as the operation stability control torques.

This control of the drive power distribution is carried out by the operation stability control unit 130 until the fail safe unit 110 detects a breakdown in any of the sensors. If a breakdown occurs in the wheel speed sensors 13, the steering angle sensor 14, the lateral acceleration sensor 16, or similar, the difference between the estimated lateral acceleration and the actual lateral acceleration will be greater than or equal to the predetermined value. During the time from the actual breakdown of the sensor until the fail safe unit 110 detects that the sensor has a breakdown, the operation stability control unit 130 carries out a control to reduce the drive torque distributed to the left and right rear wheels 3L, 3R in accordance with the difference between the estimated lateral acceleration and the actual lateral acceleration. Then the fail safe unit 110 outputs a fail safe signal to the drive circuit unit 108, and a fail safe operation is carried out. When the fail safe signal is input to the drive circuit unit 108, a relay drive current is output from the drive circuit unit 108 to the F/S relay unit 115. The F/S relay unit 115 operates to stop the distribution of drive power to left and right rear wheels 3L, 3R, by stopping the flow of drive current to the left and right electromagnetic coils 62L, 62R. Furthermore, a torque down request signal is output from the 4WD-ECU 100 to the FI/AT-ECU 10, and an alarm display signal is output to the meter unit 116.

Therefore, according to the 4WD-ECU 100 (running control device) as described above, if the difference between the estimated lateral acceleration and the actual lateral acceleration is equal to or greater than the predetermined value, the operation stability control unit 130 carries out a control to reduce the drive power (drive torque) distributed to the left and right rear wheels 3L, 3R. Therefore, it is possible to reduce the control output based on faulty output values and stabilize the behavior of the vehicle before the fail safe unit 110 detects that the lateral acceleration sensor 16 or another sensor has a breakdown. Therefore it is possible to improve the running stability of the vehicle. Also, by reducing the drive power distributed to the left and right rear wheels 3L, 3R in accordance with the difference between the estimated lateral acceleration and the actual lateral acceleration, if the distribution of drive power to the rear wheels 3L, 3R is stopped when the fail safe operation is activated, the result is that the distribution of drive power to the rear wheels 3L, 3R is gradually stopped. Therefore, the vehicle behavior immediately after start of the fail safe operation is stabilized. Furthermore, even if there is no breakdown in the lateral acceleration sensor 16 or another sensor, in response to a temporary fault in the lateral acceleration sensor 16 or another sensor, control output based on faulty measurement values can be reduced, and the vehicle behavior can be stabilized. Therefore, it is possible to improve the running stability of the vehicle.

Also, preferably the control lateral acceleration is calculated by combining the actual lateral acceleration measured by the lateral acceleration sensor 16 and the estimated lateral acceleration calculated by the estimated lateral acceleration calculation unit 131 in specific proportions calculated in accordance with the vehicle speed of the four-wheel drive vehicle 1. In this way, it is possible to easily calculate the control lateral acceleration.

Figure 6:
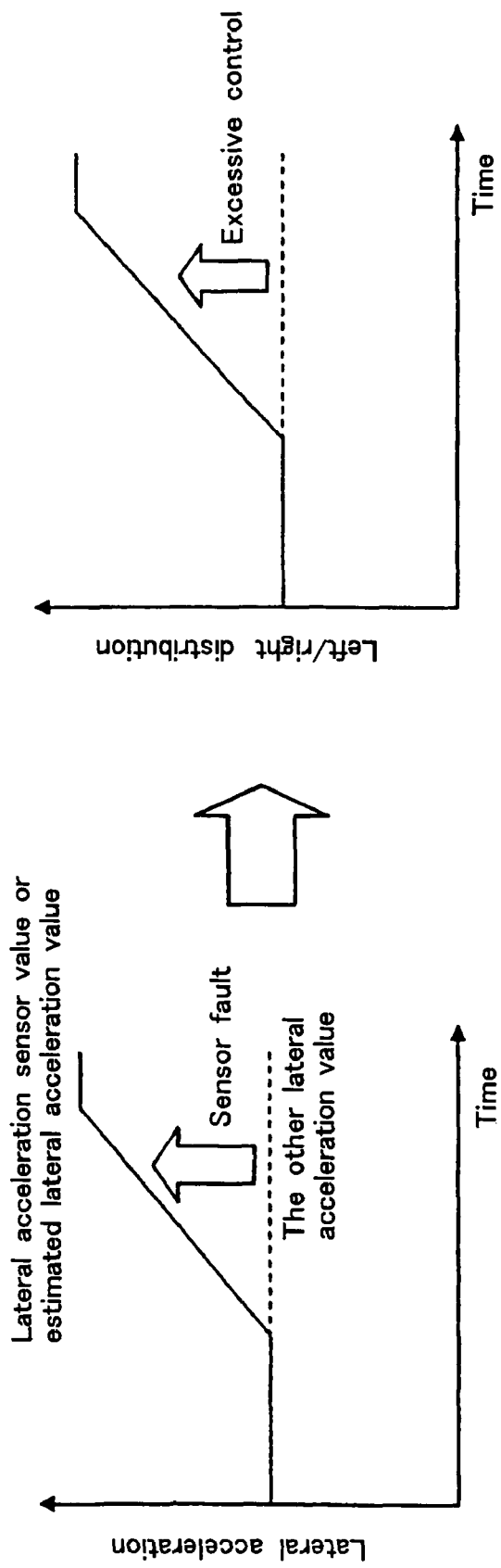
FIG. 6 is a graph showing an example of control output during a sensor breakdown according to conventional art.

Conventionally, during the period from when the lateral acceleration sensor 16 or another sensor actually has a breakdown until the fail safe unit 110 detects that the sensor has a breakdown (generally, about 10 seconds), as shown in FIG. 6 for example, each distribution ratio (left and right distribution ratios) is calculated based on abnormally high actual lateral acceleration (lateral acceleration sensor value) or estimated lateral acceleration (estimated lateral acceleration value). Therefore, the vehicle's behavior is changed by the abnormally high inappropriate drive power distribution, which could reduce the vehicle running stability.

Figure 7:
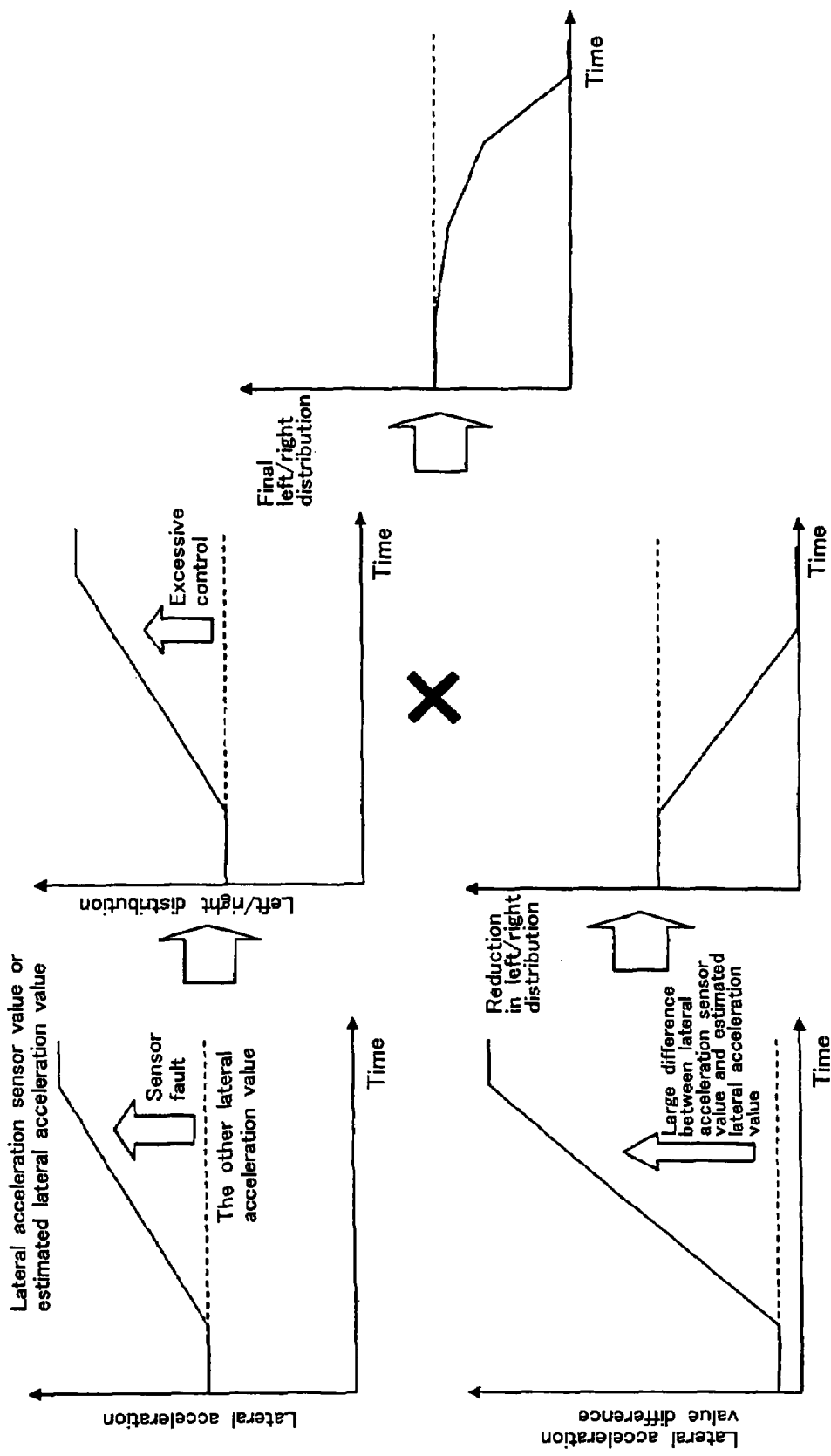
FIG. 7 is a graph showing an example of control output during a sensor breakdown according to the present embodiment.

In contrast, in the present embodiment, as shown in FIG. 7, when the difference (absolute value) in the estimated lateral acceleration and the actual lateral acceleration (lateral acceleration sensor value) is equal to or greater than a predetermined value, a reduction coefficient (left and right distribution reduction amount) is calculated whose value is set so as to become smaller as the difference between the estimated lateral acceleration and the actual lateral acceleration becomes larger. The drive torques (left and right distribution amounts) to be transmitted to the left and right rear wheels 3L, 3R calculated by the left/right distribution calculation unit 134 are multiplied by the reduction coefficient, and the drive torques multiplied by the reduction coefficient (final left and right distribution amounts) are output as the operation stability control torques. Therefore, it is possible to reduce the control output in accordance with the difference between the estimated lateral acceleration and the actual lateral acceleration.

Figure 8:
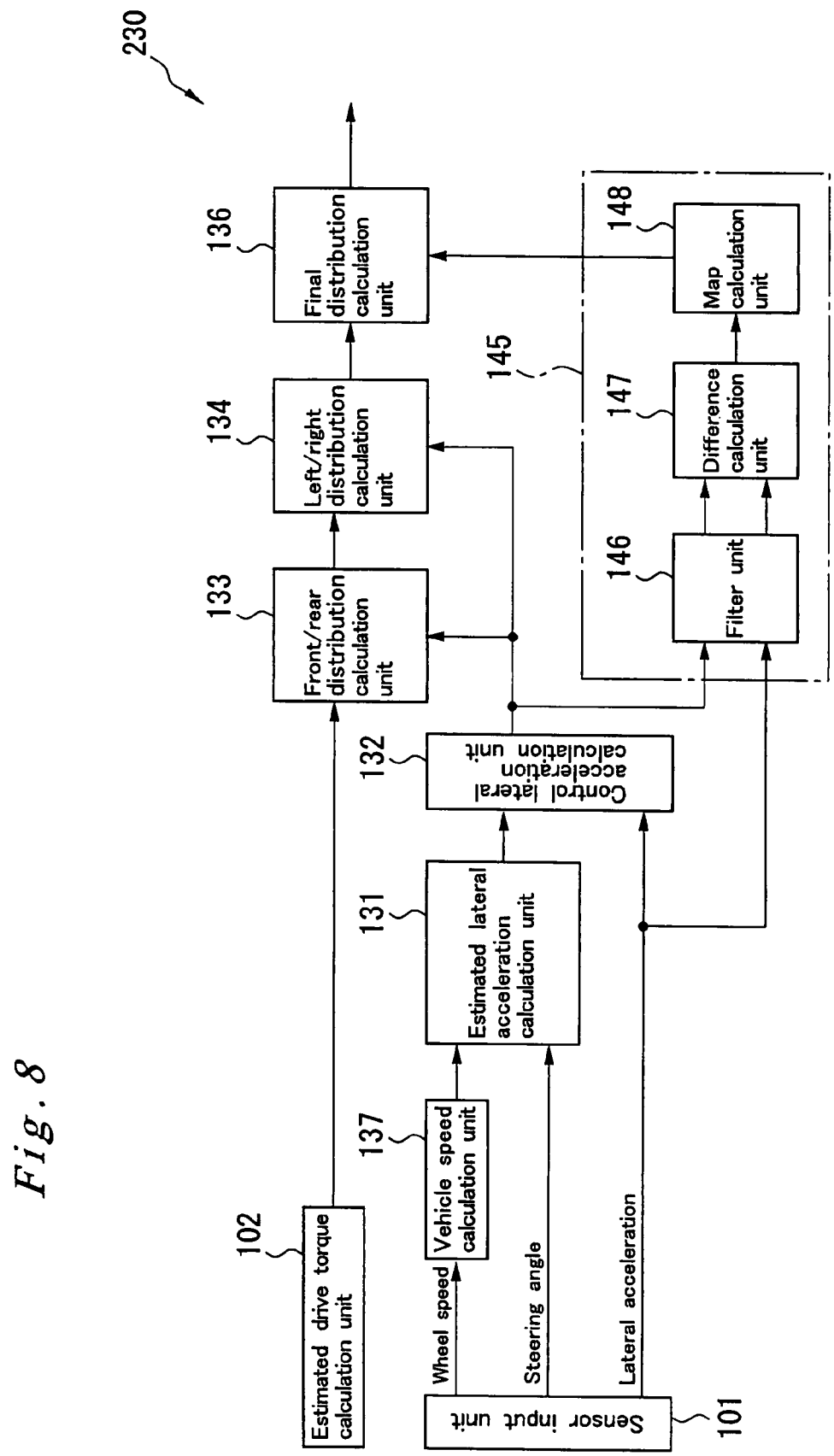
FIG. 8 is a control block diagram showing a modified example of the operation stability control unit.

Also, in the present embodiment as described above, if the difference between the estimated lateral acceleration and the actual lateral acceleration is equal to or greater than a predetermined value, the operation stability control unit 130 carries out a control to reduce the drive power (drive torque) distributed to the left and right rear wheels 3L, 3R. However, the present invention is not limited to this. For example, as shown in FIG. 8, if the difference (absolute value) in the control lateral acceleration and the actual lateral acceleration is equal to or greater than a predetermined value, a reduction coefficient whose value is set so as to become smaller as the difference between the control lateral acceleration and the actual lateral acceleration becomes larger is input to the final distribution calculation unit 136 from the distribution coefficient calculation unit 145. Then if the difference between the control lateral acceleration and the actual lateral acceleration is equal to or greater than the predetermined value, the operation stability control unit 230 may carry out a control to reduce the drive power (drive torque) distributed to the left and right rear wheels 3L, 3R. In this way, it is possible to obtain the same effect as the embodiment described above.

The operation stability control unit 230 shown in FIG. 8 is the same as that described in the above embodiment, apart from the reduction coefficient calculation unit 145, so explanations have been omitted for those elements with the same number. Also, the reduction coefficient calculation unit 145 includes a filter unit 146, a difference calculation unit 147, and a map calculation unit 148. The control lateral acceleration output from the control lateral acceleration calculation unit 132 and the actual lateral acceleration output from the sensor input unit 101 are input to the reduction coefficient calculation unit 145. The filter unit 146 is what is known as a lowpass filter. The filter unit 146 attenuates predetermined frequency components of the input control lateral acceleration and the actual lateral acceleration, and outputs the result to the difference calculation unit 147. The difference calculation unit 147 calculates the difference (absolute value) in the control lateral acceleration and the actual lateral acceleration (in which predetermined frequency components have been attenuated) input from the filter unit 146, and outputs the difference to the map calculation unit 148.

If the difference (absolute value) of the control lateral acceleration and the actual lateral acceleration input from the difference calculation unit 147 is equal to or greater than a predetermined value, the map calculation unit 148 calculates a reduction coefficient in accordance with the difference between the control lateral acceleration and the actual lateral acceleration, and outputs the calculated reduction coefficient to the final distribution calculation unit 136. The reduction coefficient is calculated from a predetermined map in accordance with the difference between the control lateral acceleration and the actual lateral acceleration. When the difference (absolute value) in the control lateral acceleration and the actual lateral acceleration is equal to or greater than a predetermined value, the larger the difference between the control lateral acceleration and the actual lateral acceleration the smaller the value of the reduction coefficient. If the difference (absolute value) in the control lateral acceleration and the actual lateral acceleration is less than the predetermined value, the map calculation unit 148 sets the reduction coefficient to 1, and outputs this value to the final distribution calculation unit 136.

Also, the present embodiment as described above includes a drive power control device 60 having left and right multiple disk type brake clutches 61L, 61R to distribute drive power to the front wheels 2L, 2R and the rear wheels 3L, 3R. However, the present invention is not limited to this, and the present invention may be applied to a four-wheel drive vehicle in which a single brake clutch of this type is provided at the middle portion of the propeller shaft.

Furthermore, in the embodiment as described above, the vehicle speed of the four-wheel drive vehicle 1 is calculated by the vehicle speed calculation unit 137 based on the rotation speed (wheel speed) of each wheel. However, the present invention is not limited to this. Each ECU may separately calculate the vehicle speed, and a vehicle speed calculation unit 137 need not be provided. Then by using (by inputting) the separately calculated vehicle speed, the estimated lateral acceleration and coefficients K (the proportions for combining the actual lateral acceleration and the estimated lateral acceleration) may be calculated.

Also, in the embodiment as described above, when the difference between the estimated lateral acceleration and the actual lateral acceleration is equal to or greater than a predetermined value, the operation stability control unit 130 carries out a control to reduce the drive power (drive torque) distributed to the left and right rear wheels 3L, 3R. However, the present invention is not limited to this. If brake clutches (clutch devices) are provided on the front wheel side, a control may be carried out to reduce the drive power (drive torque) distributed to the front wheels.

Furthermore, in the embodiment as described above, the final distribution calculation unit 136 multiplies the drive torques (to be transmitted to the left and right rear wheels 3L, 3R) calculated by the left/right distribution calculation unit 134 by the reduction coefficient. However, the present invention is not limited to this. The drive torque (to be transmitted to the rear wheels) calculated by the front/rear distribution calculation unit 133 may be multiplied by the reduction coefficient, or the engine ENG estimated drive torque input from the estimated drive torque calculation unit 102 may be multiplied by the reduction coefficient.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2006-129612 filed on May 8, 2006, which is incorporated herein by reference.

What is claimed is:

1. A running control device for a four-wheel drive vehicle that runs by transmitting rotational output from an engine to front wheels and rear wheels, comprising:

lateral acceleration measurement means for measuring an actual lateral acceleration acting on the four-wheel drive vehicle;

lateral acceleration calculation means for calculating an estimated lateral acceleration of the four-wheel drive vehicle based on the speed of the four-wheel drive vehicle and the steering angle of the front wheels, which are steering wheels;

control lateral acceleration calculation means for calculating a control lateral acceleration from the actual lateral acceleration measured by the lateral acceleration measurement means and the estimated lateral acceleration calculated by the lateral acceleration calculation means; and drive power distribution control means for carrying out control of distribution of drive power transmitted to the front wheels and rear wheels from the engine based on the control lateral acceleration calculated by the control lateral acceleration calculation means, wherein if the difference between the estimated lateral acceleration and the actual lateral acceleration, or the difference between the control lateral acceleration and the actual lateral acceleration is equal to or greater than a predetermined value, the drive power distribution control means carries out a control to reduce the drive power distributed to the front wheels or the rear wheels.

2. The running control device for a four-wheel drive vehicle according to claim 1, wherein the control lateral acceleration calculation means calculates the control lateral acceleration by combining the actual lateral acceleration and the estimated lateral acceleration in specific proportions, and the specific proportions are calculated in accordance with the speed of the four-wheel drive vehicle.

3. The running control device for a four-wheel drive vehicle according to claim 2, wherein the control lateral acceleration calculation means calculates the control lateral acceleration based on the actual lateral acceleration and estimated lateral acceleration using the following equation, Control lateral acceleration=(estimated lateral acceleration×$K$)+{actual lateral acceleration×(1−$K$)} where K is a coefficient that decreases as the vehicle speed increases (0≦K≦1), and the coefficient K is calculated based on a map set in advance in accordance with the vehicle speed.

4. The running control device for a four-wheel drive vehicle according to claim 1, wherein when the difference between the estimated lateral acceleration and the actual lateral acceleration, or the difference between the control lateral acceleration and the actual lateral acceleration is equal to or greater than a predetermined value, the drive power distribution control means carries out a control to reduce the normal drive power distributed to the front wheels or rear wheels during normal times by multiplying the normal drive power by a reduction coefficient (<1) that becomes smaller as the difference becomes larger and to distribute and transmit the reduced drive power to the front wheels or rear wheels.

5. The running control device for a four-wheel drive vehicle according to claim 4, wherein when the difference between the estimated lateral acceleration and the actual lateral acceleration, or the difference between the control lateral acceleration and the actual lateral acceleration is less than the predetermined value, the reduction coefficient is set to 1.0.

6. A running control method for a four-wheel drive vehicle that runs by transmitting rotational output from an engine to front wheels and rear wheels, comprising:

measuring an actual lateral acceleration acting on the four-wheel drive vehicle;

calculating an estimated lateral acceleration of the four-wheel drive vehicle based on the speed of the four-wheel drive vehicle and the steering angle of the front wheels, which are steering wheels;

calculating a control lateral acceleration from the actual lateral acceleration measured by the lateral acceleration measurement means and the estimated lateral acceleration calculated by the lateral acceleration calculation means; and controlling distribution of drive power transmitted to the front wheels and rear wheels from the engine based on the control lateral acceleration calculated by the control lateral acceleration calculation means, wherein said controlling reduces the drive power distributed to the front wheels or the rear wheels when the difference between the estimated lateral acceleration and the actual lateral acceleration, or the difference between the control lateral acceleration and the actual lateral acceleration is equal to or greater than a predetermined value.

7. The running control method for a four-wheel drive vehicle according to claim 6, wherein the control lateral acceleration is calculated by combining the actual lateral acceleration and the estimated lateral acceleration in specific proportions, and the specific proportions are calculated in accordance with the speed of the four-wheel drive vehicle.

8. The running control method for a four-wheel drive vehicle according to claim 7, wherein the control lateral acceleration is calculated based on the actual lateral acceleration and estimated lateral acceleration using the following equation, Control lateral acceleration=(estimated lateral acceleration×$K$)+{actual lateral acceleration×(1−$K$)} where K is a coefficient that decreases as the vehicle speed increases (0≦K≦1), and the coefficient K is calculated based on a map set in advance in accordance with the vehicle speed.

9. The running control method for a four-wheel drive vehicle according to claim 6, wherein when the difference between the estimated lateral acceleration and the actual lateral acceleration, or the difference between the control lateral acceleration and the actual lateral acceleration is equal to or greater than a predetermined value, said controlling reduces the normal drive power distributed to the front wheels or rear wheels during normal times by multiplying the normal drive power by a reduction coefficient (<1) that becomes smaller as the difference becomes larger.

10. The running control method for a four-wheel drive vehicle according to claim 9, wherein when the difference between the estimated lateral acceleration and the actual lateral acceleration, or the difference between the control lateral acceleration and the actual lateral acceleration is less than the predetermined value, the reduction coefficient is set to 1.0.

* * * * *